United States Patent [19]
Wildi et al.

[11] Patent Number: 5,336,701
[45] Date of Patent: Aug. 9, 1994

[54] PROCESS IMPROVEMENT FOR IMPROVED COLOR REDUCED GLOSS THERMOPLASTIC COMPOSITIONS

[75] Inventors: Robert H. Wildi, Parkersburg; Keith E. Cox, Mineral Wells; Jack A. Hill, Vienna, all of W. Va.

[73] Assignee: General Electric Company, Pittsfield, Mass.

[21] Appl. No.: 951,600

[22] Filed: Sep. 28, 1992

[51] Int. Cl.$^5$ .................... C08K 3/20; C08L 63/02
[52] U.S. Cl. ........................... 523/411; 523/404; 523/406; 525/107; 525/113; 525/122
[58] Field of Search ............... 523/411, 404, 406, 407; 525/107, 122, 113

[56] References Cited

U.S. PATENT DOCUMENTS

| | | |
|---|---|---|
| 4,000,216 | 12/1976 | Lang . |
| 4,387,179 | 6/1983 | Sun ........................ 524/458 |
| 4,526,926 | 7/1985 | Weber et al. . |
| 4,554,316 | 11/1985 | Sakano et al. . |
| 4,624,986 | 11/1986 | Weber et al. . |
| 4,683,265 | 7/1987 | Kress et al. . |
| 4,742,104 | 5/1988 | Lindner et al. . |
| 4,885,335 | 12/1989 | Gallucci et al. . |
| 4,898,911 | 2/1990 | Miyashita et al. . |
| 4,902,743 | 2/1990 | Boutni . |
| 4,906,689 | 3/1990 | Boutni . |
| 5,026,777 | 6/1991 | Jalbert et al. . |
| 5,061,754 | 10/1991 | Dufour et al. . |
| 5,104,935 | 4/1992 | Leitz et al. ........................ 525/67 |
| 5,130,374 | 7/1992 | Cozens et al. . |

FOREIGN PATENT DOCUMENTS

| | | |
|---|---|---|
| 0143948 | 12/1985 | European Pat. Off. . |
| 0330153 | 8/1989 | European Pat. Off. . |
| 0352822 | 1/1990 | European Pat. Off. . |
| 0375952 | 4/1990 | European Pat. Off. . |
| 0375648 | 6/1990 | European Pat. Off. . |
| 2191656 | 7/1990 | Japan . |
| WO-/A9107466 | 3/1991 | World Int. Prop. O. . |

OTHER PUBLICATIONS

Journal of American Chemical Society, 1948, vol. 70, pp. 4045–4048.

Primary Examiner—Melvyn J. Marquis
Assistant Examiner—D. Aylward

[57] ABSTRACT

A process is provided for producing improved color acrylonitrile polymer gels involving compounding a composition of an acrylonitrile polymer with an electrophilic reagent to produce acrylonitrile polymer gels, and admixing water with the gels to reduce the yellowness thereof. Improved color, reduced gloss polycarbonate/graft polymer blends are provided by compounding the resultant gels with polycarbonate, a styrene-acrylonitrile copolymer and ABS graft polymer to form reduced gloss PC/ABS/SAN composition. The process provides acrylonitrile gels and reduced gloss compositions exhibiting improved levels of color. The blend compositions are useful as molding resins and the gelled acrylonitrile polymer is useful as a gloss reducing additive.

19 Claims, No Drawings

PROCESS IMPROVEMENT FOR IMPROVED COLOR REDUCED GLOSS THERMOPLASTIC COMPOSITIONS

BACKGROUND OF THE INVENTION

1. Field of the Invention

The present invention relates to reduced gloss thermoplastic compositions, gloss reducing additives, and processes for making the compositions and additives, and more particularly relates to improved color reduced gloss thermoplastic compositions and gels of rigid copolymers, and processes for making the improved color gels and compositions.

2. Description of the Related Art

Low gloss compositions comprising a polymer blend of a polycarbonate and an emulsion grafted ABS polymer, and a low gloss enhancing amount of a poly(epoxide) are known, see Jalbert et al U.S. Pat. No. 5,026,777 which is incorporated herein by reference. Single step compounding however can result in undesired side reactions, including side reactions of the polyepoxide with additional ingredients such as phosphite stabilizers and some organic and metal pigments which may affect product consistency and quality.

Low gloss compositions comprising a polymer blend of a polycarbonate, an emulsion grafted ABS polymer, and a gloss reducing amount of gels formed from crosslinking a rigid acrylonitrile polymer can exhibit undesired levels of yellowness. For example, where such gels are formed by reacting acrylonitrile polymer with a polyepoxide in the presence of an acid, the resultant gel composition exhibits undesirably high levels of yellowness, and thus the final blend composition of polycarbonate, emulsion grafted ABS polymer, and acrylonitrile gels, exhibits an undesirably high level of yellowness.

Consequently, there is a desire to provide a process for making acrylonitrile gels which results in acrylonitrile gels which exhibit reduced levels of yellowness.

SUMMARY OF THE INVENTION

The present invention is directed to a process for making acrylonitrile polymer gels by compounding an acrylonitrile polymer with an electrophilic reagent in the presence of a ring-opening agent and water to form polymeric gels.

The present invention is also directed to a process for making an improved color reduced gloss resin composition in which the matte finish is achieved by gelation of a styrene-acrylonitrile copolymer in the presence of a small amount of water to form insoluble gels and then blending the gels with an aromatic polycarbonate resin, a graft polymer resin, and optionally additional rigid styrene-acrylonitrile copolymer. The present processes reduce the yellowness of the acrylonitrile polymer gels and reduce the yellowness of the final reduced gloss blend compositions. The process provides consistent, quality product that when molded exhibits a uniform low gloss while exhibiting reduced yellowness level.

DETAILED DESCRIPTION OF THE INVENTION

The process of the present invention involves compounding acrylonitrile polymer with an electrophilic reagent such as a polyepoxide and water to form polymeric gels exhibiting reduced levels of yellowness. Preferably, the compounding is conducted in the presence of an epoxide ring-opening catalyst such as a sulfonic acid. The process of the present invention also preferably further includes compounding the resultant acrylonitrile polymer gels with polycarbonate resin and an ABS graft polymer to produce a low gloss thermoplastic composition exhibiting reduced levels of yellowness.

The preferred thermoplastic molding compositions of the invention comprise a polymer blend of a polycarbonate, an ABS graft polymer, styrene-acrylonitrile copolymer and acrylonitrile containing polymer which has undergone a Ritter reaction with the polyepoxide and has been compounded with a small amount of color reducing water. Ritter reactions are discussed in J. J. Ritter, P. P. Mineri *Journal of American Chemical Society*, 1948,70,4045.

The ABS resin which is included in the present compositions comprises ABS type polymers, the molecules of which contain two or more polymeric parts of different composition, namely a rubbery backbone part and a graft portion, that are bonded chemically. The ABS polymer is preferably prepared by polymerizing a conjugated diene monomer, such as butadiene, or a conjugated diene with a monomer copolymerizable therewith, such as styrene, to provide a polymeric backbone. After formation of the backbone, at least one grafting monomer, and preferably two, are polymerized in the presence of the prepolymerized backbone to obtain the graft polymer. The ABS resins are preferably prepared by emulsion grafting methods well known in the art.

The specific conjugated diene monomers normally utilized in preparing the backbone of the graft polymer are generically described by the following formula:

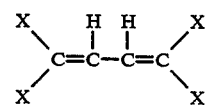

wherein X is selected from the group consisting of hydrogen, alkyl groups containing from one to five carbon atoms, chlorine or bromine. Examples of dienes that may be used are butadiene, isoprene, 1,3-heptadiene, methyl-1,1,3-pentadiene, 2,3-dimethylbutadiene, 2-ethyl-1,2-pentadiene 1,3- and 2,4-hexadienes, chloro and bromo substituted butadienes such as dichlorobutadiene, bromobutadiene, dibromobutadiene, mixtures thereof, and the like. A preferred conjugated diene is 1,3-butadiene.

Optionally, the rubbery backbone may be an acrylate rubber, such as one based on n-butyl acrylate, ethylacrylate, 2-ethylhexylacrylate, and the like. Additionally, minor amounts of a diene may be copolymerized in the acrylate rubber backbone to yield improved grafting with the matrix polymer. These resins are well known in the art and many are commercially available.

The backbone part, as mentioned, is preferably a conjugated diene polymer such as polybutadiene, polyisoprene, or a copolymer, such as butadiene-styrene, butadiene-acrylonitrile, or the like.

One monomer or group of monomers that may be polymerized in the presence of the prepolymerized backbone to form the graft portion of the ABS graft polymer include monovinylaromatic compounds. The monovinylaromatic monomers utilized are generically described by the following formula:

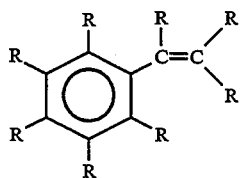

wherein R is selected from the group consisting of hydrogen, alkyl groups of 1 to 5 carbon atoms, cycloalkyl, aryl, alkaryl, aralkyl, alkoxy, aryloxy, and halogens. Examples of substituted vinylaromatic compounds include styrene, 4-methylstyrene, 3,5-diethylstyrene, 4-n-propylstyrene, α-methylstyrene, αmethyl vinyltoluene, α-chlorostyrene, α-bromostyrene, dichlorostyene, dibromostyrene, tetrachlorostyrene, mixtures thereof and the like. The preferred monovinylaromatic monomers used are styrene and/or α-methylstyrene.

A second group of monomers that may be polymerized in the presence of the prepolymerized backbone to form the graft portion of the ABS resin include acrylic monomers such as acrylonitrile, substituted acrylonitrile, and/or acrylic acid esters, for example alkyl acrylates such as methyl methacrylate.

The acrylonitrile, substituted acrylonitrile, or acrylic acid esters are described generically by the following formula:

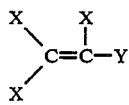

wherein X is as previously defined and Y is selected from the group consisting of cyano and carbalkoxy groups wherein the alkoxy group of the carbalkoxy contains from one to about twelve carbon atoms. Examples of such monomers include acrylonitrile, ethacrylonitrile, methacrylonitrile, α-chloroacrylonitrile, α-bromoacrylonitrile, optionally with methyl acrylate, methyl methacrylate, ethyl acrylate, butyl acrylate, propylacrylate, isopropyl acrylate and mixtures thereof. The preferred acrylic monomer is acrylonitrile and the preferred acrylic acid esters are ethyl acrylate and methyl methacrylate. It is also preferred that the acrylic acid esters, when included, are employed in combination with acrylonitrile.

In the preparation of the ABS graft polymer, the rubbery backbone part which is preferably a conjugated diolefin polymer or copolymer exemplified by a 1,3-butadiene polymer or copolymer is present at a level of at least 10% by weight, and preferably at least 25% by weight, more preferably at least 50% by weight and up to about 80% by weight, based on the total weight of the ABS graft polymer. The graft portion obtained by polymerizing monomers in the presence of the backbone, exemplified by styrene and acrylonitrile, which are preferably present at a level of from 20 to about 90% by weight based on the total weight of the ABS graft polymer. It is additionally preferred that the second group of grafting monomers, exemplified by acrylonitrile, ethyl acrylate and methyl methacrylate, comprise from about 10% to about 40% by weight of the grafted portion of the ABS resin while the monovinylaromatic hydrocarbon monomers, exemplified by styrene, comprise from about 60 to about 90% by weight of the grafted portion of the ABS resin.

In preparing the graft polymer, it is normal to have a certain percentage of the polymerizing monomers that are not grafted on the backbone combine with each other and occur as non-grafted grafting monomer and acrylonitrile is the second grafting monomer, a certain portion of the composition will copolymerize as free styrene-acrylonitrile copolymer. Similarly, in the case where α-methylstyrene (or another monomer) is substituted for the styrene in the composition used in preparing the graft polymer, a certain percentage of the composition may be an α-methylstyrene-acrylonitrile copolymer.

In the process of the present invention gels of acrylonitrile containing polymer, such as styrene-acrylonitrile copolymer or α-methylstyrene-acrylonitrile copolymer gels are blended with the graft ABS polymer and polycarbonate by mechanical blending following a first gelation step which preferably involves melt compounding the rigid acrylonitrile polymer with a polyepoxide and an acid to form acrylonitrile gels wherein the gelation produces are then admixed with a small amount of water to reduce the yellowness of the gelation product. The rigid acrylonitrile polymers may be based on one or more of the following: acrylonitrile or substituted acrylonitrile either alone or in combination with monovinylaromatic compounds, methacrylic acid esters of $C_1$-$C_4$ aliphatic alcohols, and imidized maleic anhydride derivatives which are unsubstituted or substituted with an alkyl or aryl group. Examples of these rigid acrylonitrile copolymers which may be compounded with the polyepoxide, epoxide ring-opening catalyst and admixed with water, and then blended with the ABS graft polymer and the polycarbonate resin include copolymers of acrylonitrile or substituted acrylonitrile with one or more of the $C_1$-$C_4$ acrylates, styrene, and/or α-methylstyrene, and the like. Preferably the acrylonitrile copolymer comprises at least 5% by weight, more preferably 15% by weight, and most preferably at least 19% by weight acrylonitrile monomer based on the total weight of the acrylonitrile polymer. The term polymer is meant to include homopolymer and copolymers. Such acrylonitrile polymers may be prepared by emulsion, bulk, suspension, bulk-suspension or solution polymerization methods which are well known in the art. Such acrylonitrile copolymers may also be rubber modified, for example, ABS, AES and ASA resins. Preferably, the rigid acrylonitrile polymers comprise less than 1 percent by weight rubber based on the total weight of acrylonitrile polymer, and more preferably are free of rubber.

In a preferred embodiment of the invention, the ABS resin contains at least 70 wt % of the diene rubber backbone and little or no free rigid polymers or copolymers are included in the molding composition. In an alternative preferred embodiment, the ABS resin contains at least 50 wt % of the diene rubber backbone. The present compositions also contain a polycarbonate component. Polycarbonates are derived from the reaction of carbonic acid derivatives with aromatic, aliphatic, or mixed diols. They may be produced by the reaction of phosgene with a diol in the presence of an appropriate hydrogen chloride receptor or by a melt transesterification reaction between the diol and a carbonate ester. Polycarbonate can be made from a wide variety of starting materials, however, the principal polycarbonate produced commercially and preferred herein is bisphenol A polycarbonate, a polycarbonate made by reacting bisphenol A with phosgene by condensation.

Also preferred are blends of bisphenol A polycarbonate with homopolymers and/or copolymers of brominated bisphenol A polycarbonate.

For a more complete discussion of the chemistry of polycarbonates, one may refer to Kirk-Othmer Encyclopedia of Chemical Technology, Third Edition(1982) Vol. 18, pp. 479–494. This article, by D. W. Fox, is incorporated by reference in its entirety.

The present compositions also include a poly(epoxide) component which preferably comprises a diepoxide. Various diepoxides which are useful in the present invention are described in U.S. Pat. No. 2,890,209. The diepoxides may be prepared by the catalytic esterification of 3,4-epoxycyclohexylmethyl 3,4-epoxycyclohexanecarboxylates and have the general formula:

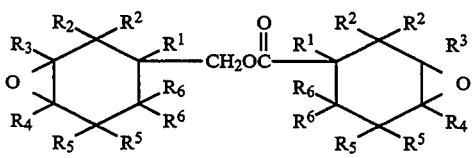

wherein $R^1$, $R^2$, $R^3$, $R^4$, $R^5$, and $R^6$ represent members selected from the group consisting of hydrogen and lower alkyl groups containing one to four carbon atoms. When any of $R_1$ through $R^6$ represent alkyl groups and particularly the lower alkyl groups, a preferred class of diepoxides are those wherein the total number of carbon atoms contained in the alkyl groups does not exceed twelve. A particularly preferred class of compounds represented by the general formula above are those wherein $R_1$ through $R^6$ represent members selected from the group consisting of hydrogen and methyl groups. Polymers and particularly the homopolymers made from diepoxide monomers and mixtures thereof having not more than three alkyl substituents per carbocyclic ring are preferred.

The diepoxides represented by the above formula can be conveniently prepared by reacting a selected 3-cyclohexenyl-methyl-3-cyclohexenecarboxylate with peracetic acid. The 3-cyclohexenyl-methyl-3-cyclohexenecarboxylates, in turn, are readily prepared by reacting a selected 3-cyclohexenecarboxy aldehyde in the presence of an aluminum alkoxide catalyst dissolved in an inert solvent, such as benzene, at a temperature in the range of 0° to 110° C.

The compositions of the invention preferably contain gels in an amount sufficient to enhance the matte finish of the blends. In preferred embodiments, the gels are formed by compounding an acrylonitrile containing polymer preferably styrene-acrylonitrile copolymer with from about 0.01 to about 10 weight percent of the polyepoxide Ritter reagent based on the total weight of rigid acrylonitrile polymer, and more preferably from about 0.5 to about 4 weight percent of the polyepoxide based on the weight of the rigid acrylonitrile polymer. In other words, the rigid acrylonitrile polymer is compounded with an electrophilic reagent thereby undergoing a Ritter reaction and forming gels. Suitable electrophilic reagents include also acid catalysts such as Ti—$OR_4$, $RSO_3H$, mineral acids, $BF_3$, amines, zinc halides such as zinc chloride.

The final reduced gloss compositions may also include conventional additives such as antioxidants, lubricants, pigments, phosphites, halogenated fire retardant additives, phosphate flame retardants and the like. Preferably the gelation step is free of additives which will interfere with the gelation process.

The compositions preferably comprise from about 10 to 90 weight percent aromatic polycarbonate resin based on the total weight of the composition, from 90 to 10 weight percent ABS graft polymer based on the total weight of the composition, and from 1 to 50 weight percent of rigid acrylonitrile polymer based on the total weight of the composition, wherein the rigid acrylonitrile polymer comprises a sufficient amount of gels to reduce the gloss of the composition. More preferably, the blend comprises from 30 to 80 weight percent polycarbonate, 30 to 5 weight percent ABS graft polymer, and from 5 to 65 weight percent rigid acrylonitrile polymer based on the total weight of the composition. The preferred rigid acrylonitrile polymer is a styrene-acrylonitrile copolymer.

The rigid acrylonitrile polymer gels may also be blended with other polymers to reduce the gloss thereof. Suitable other polymers include polycarbonate, polymethylmethacrylate, ABS, and blends such as polycarbonate/polymethylmethacrylate ABS blends. The gels of acrylonitrile polymer are preferably blended with thermoplastic resins that are chemically different from the acrylonitrile polymer, for example gels of styrene-acrylonitrile polymer blended with polycarbonate resin, acrylonitrile-butadiene-styrene graft copolymers, polymethylmethacrylate resin, and blends thereof.

The rigid copolymer gels are made by blending rigid acrylonitrile polymer with an electrophilic reagent such as a polyepoxide in the presence of an acid media. The resulting gelled acrylonitrile containing polymer composition is typically a blend of a non-crosslinked rigid acrylonitrile polymer and crosslinked rigid acrylonitrile polymeric gel. The gel containing compositions are useful to reduce the gloss of ABS/polycarbonate polymeric compositions.

A preferred diepoxide based resin comprises Bakelite® ERL 4221 supplied by Union Carbide. Other multifunctional epoxides that are expected to function in a manner similar to the preferred diepoxides include the following:

SIMPLE ALIPHATIC DIEPOXIDES dodecatriene dioxide;
dipentene dioxide;
1,2,7,8-diepoxy octane.

BIS(GLYCIDYL ETHER/ESTER) EPOXIDES polycondensates of epihalohydrin and diols or diacids wherein the diol/diacid may be either aliphatic or aromatic, such as adipic acid and phthallic acid;
1,4 butanediol-diglycidyl ether;
Bis-glycidyl ether of bisphenol A.

CYCLOALIPHATIC DIEPOXIDES 3,4-epoxycyclohexyl-3, 4-epoxycyclohexylcarboxylate, e.g. Union Carbide's ERL 4221;
bis(c,4-epoxycyclohexylmethyl)adipate, e.g. Union Carbide's ERL 4229;
cyclooctadiene (1.5)di-epoxide;
1,2,5,6-diepoxy cyclododecane-9;
bicycloheptadiene diepoxide.

MIXED ALIPHATIC AND CYCLOALIPHATIC DIEPOXIDES vinyl cyclobutene dioxide;

vinyl cyclopentadiene dioxide;
vinyl cyclohexene dioxide, e.g. Union Carbide's ERL 4206;
butenecyclobutene dioxide;
butenecyclopentene dioxide;
butadienecyclobutadiene dioxide;
butadienecyclopentadiene dioxide;
pentadienecyclobutadiene dioxide.

TRI AND POLY (DI/TRI) EPOXIES glycidyl ethers, of novalaks, e.g. Dow;s D.E.R. 431 and Shell's Epon 1031;
tetraglycidyl ether of 1,1,2,2, tetrakis(4-hydroxyphenyl) ethane;
triglycidyl ether of 1,3,6-trihydroxybenzene;
triglycidyl isocyanurate (TGIC).

EPOXIDIZED DRYING AND NON-DRYING OIL ACIDS

Epoxidized tall oils, e.g. Monoplex S-73;
Epoxidized linseed oils;
Epoxidized soy bean oils, e.g. Paraplex G-62.

In addition to diepoxides, other electrophilic reagents may be used in the gelation step.

In accordance with an important feature of the invention, the polymer compositions contain gels of a rigid acrylonitrile containing polymer preferably formed from styrene and acrylonitrile. More particularly, the rigid acrylonitrile polymer is preferably formed from at least about 50 weight percent of one or more monomers selected from the group consisting of styrene, α-methylstyrene and halogen-substituted styrene, and at least 5 weight percent acrylonitrile. Preferably, the rigid acrylonitrile polymer is formed from 10 to about 40 weight percent acrylonitrile. The rigid polymer may further include at least one additional monomer, for example maleic anhydride, methyl methacrylate and/or a malemide, for example N-phenyl maleimide, as long as the rigid acrylonitrile polymer includes at least 10 weight percent acrylonitrile based on the total weight of the rigid acrylonitrile polymer. In a further preferred embodiment, the rigid acrylonitrile polymer is formed from styrene monomer and at least one monomer selected from α-methylstyrene and halogen-substituted styrene, in addition to the acrylonitrile. By compounding the rigid acrylonitrile polymer with a polyepoxide and an acid, insoluble polymeric gels are formed which when further blended with aromatic polycarbonate resin, styrene-acrylonitrile copolymer and ABS resin provide a composition exhibiting reduced gloss. Gloss is measured by ASTM D-523. Gels are defined as a crosslinked polymer which can be measured by solvent swell techniques and rheological methods well known in the art. Izod impact is measured by ASTM D-256 and melt viscosity is measured by ASTM D1238-73.

The gels of acrylonitrile rigid polymer can be formed by a Ritter reaction which may involve formation of amides by addition of olefins or secondary and tertiary alcohols to nitrites in strongly acidic media. Suitable Ritter reagents include diepoxides, alkyl halides, alcohols, acid chlorides, anhydrides ethers, α and β unsaturated acids and esters. Suitable epoxide ring opening catalysts include, amines, imidazoles, organic acids, such as carboxylic, and sulfonic acids, and mineral acids and Lewis Acids. Suitable sulfonic acids include dodecylbenzene sulfonic acid.

The process of the present invention involves compounding an acrylonitrile copolymer with an electrophilic reagent to form polymeric gels; admixing an amount of water with the product from the compounding step to reduce the color of the product. Preferably the compounding step involve compounding a melted acrylonitrile copolymer with an electrophilic reagent to form polymeric gels, and then admixing water with the melted product from the compounding step. Preferably the compounding and admixing are achieved by using a melt extruder, wherein the acrylonitrile polymer, preferably styrene acrylonitrile copolymer, is added at the upstream end of a twin screw extruder, a diepoxide such as Bakelite ®ERL 4221 supplied by Union Carbide (3,4-epoxycyclohexel-3,4-epoxycyclohexel carboxylate) is added at the upstream end of the reactor and an epoxide ring-opening catalyst, for example dodecyl sulfonic acid is also added at the upstream end of the extruder. The extruder then compounds the styrene acrylonitrile copolymer, diepoxide and sulfonic acid sufficiently to cause gel formation, and then at the downstream end of the extruder volatiles are optionally vacuumed therefrom followed by addition of an amount of water adjacent the downstream end of the extruder sufficient to effectively reduce the yellowness index of the product from the compounding step upon admixing of the water with the gelation product in the downstream end section of the extruder. This admixing of water into the compounded product has been found to effectively reduce the yellowness index of the resultant product, and thereby reduce the final yellowness index of the final polycarbonate/ABS graft copolymer/SAN gel composition. Suitable levels of diepoxide, sulfonic acid and water include for example 3.0 percent by weight diepoxide based on the total weight of acrylonitrile polymer, 700 parts per million dodecyl sulfonic acid based on the total weight of acrylonitrile polymer, and 0.25 percent by weight water based on the total weight of acrylonitrile polymer. Suitable levels of water usage include for example 0.05 to 1.0 percent by weight based on the total weight of acrylonitrile polymer. Amounts of water above 1.0 percent tend to cause undesired levels of open cell foam formation in the gelled acrylonitrile polymer leading to difficulty in drying of the resultant product from the admixing step. Preferably the water is admixed with the product from the compounding step in an amount of from 0.10 to 0.60 percent by weight based on the total weight of the acrylonitrile polymer, and even more preferably at a level of from 0.2 to 0.5 percent by weight based on the total weight of acrylonitrile polymer.

EXAMPLES

The polycarbonate used in Table 1 is a bisphenol A polycarbonate obtained by reacting bisphenol A with phosgene and was obtained from General Electric Company as Lexan ® polycarbonate resin.

The ABS of Table 1 is an ABS graft polymer comprising 50 percent by weight polybutadiene rubber, and 50 percent by weight of a styrene-acrylonitrile polymeric graft portion which comprises 75 percent by weight styrene and 25 percent by weight acrylonitrile. The ABS resin also contains some free styrene-acrylonitrile copolymer.

The SAN resin which is used in examples A-J and 1-6 is a styrene acrylonitrile copolymer comprising 75 weight percent styrene and 25 weight percent acrylonitrile.

SAN Gel for the comparative examples B-J was obtained by exposing the SAN resin to a Ritter reaction gelation step involving compounds SAN and DEPX under melt extrusion through a 58 mm twin extruder in the presence of DDBSA. The DEPX is compounded with the SAN at a level of 3.0 weight percent based on the total weight of the SAN.

DEPX is Bakelite® ERL 4221 supplied by Union Carbide (3,4-epoxycyclohexyl-3,4epoxycyclohexylcarboxylate. DDBSA is dodecylbenzenesulphonic acid.

TABLE 1

| EXAMPLES: | A | B | 1 |
|---|---|---|---|
| SAN Gel Data: | | | |
| Parts Water Inj. | — | none | 0.25 |
| Melt Temp. | — | 667° F. | 650° F. |
| Die deltaP | — | 1500 psi | 1100 psi |
| SEC (wHr/g) | — | 0.313 | 0.318 |
| PC/ABS Alloy Data: | | | |
| Parts SAN Gel | none | 12.0 | 12.0 |
| Parts SAN | 18.0 | 6.0 | 6.0 |
| Total Parts SAN | 18.0 | 18.0 | 18.0 |
| Hunter 60° Gloss | 96 | 22 | 23 |
| ⅛″ Izod @73° F. | 10.4 | 9.0 | 9.0 |
| Plaque Color | | | |
| L | 85.46 | 82.03 | 83.51 |
| a | −2.58 | −0.95 | −1.86 |
| b | 11.93 | 17.14 | 15.02 |
| deltaE | Std. | 6.46 | 3.88 |

The injection of a very small amount of water to the reactive extruder after the vent with a melt seal to prevent it from flashing back to the vent results in a reduction in the base color of the gel and of the final reduced gloss blend. The effect in ABS/PC blends containing acrylonitrile polymer gels formed by compounding SAN rigid polymer with a diepoxide (DEPX) and a sulphonic acid (DDBSA) followed by admixing therewith 0.25 parts water in the gel is presented in Table 1, as illustrated by Example 1. Comparative Example A illustrates the color for polycarbonate/ABS graft copolymer blend compositions containing styrene acrylonitrile copolymer and no styrene-acrylonitrile polymer gel. Comparative Example B involves polycarbonate/ABS graft copolymer blend which contains styrene-acrylonitrile polymer gel obtained by compounding styrene-acrylonitrile polymer with a diepoxide (DEPX) and a sulphonic acid (DDBSA) which has not been manufactured in the presence of an effective amount of water sufficient to reduce color of the gel (in other words no admixing step employing water was used). Note that the delta E for comparative Example B is 6.46 compared to Example 1 which is 3.88. Example 1 involves a polycarbonate/ABS graft copolymer blend which employs 12 parts styrene acrylonitrile gel which was manufactured in the presence of 0.25 parts water which was sufficient to reduce the yellowness index and color of the blend composition.

Izod impact strength is measured in foot pound/inches.

TABLE 2

| EXAMPLE | L | a | b | YI | WATER % | ACID PPM | ERL PPH | RATE LB/HR |
|---|---|---|---|---|---|---|---|---|
| C | 96.22 | −0.46 | 1.82 | 2.67 | — | — | — | 500 |
| D | 96.39 | −0.55 | 1.96 | 2.86 | 0.066 | — | — | 500 |
| E | 96.41 | −0.49 | 1.90 | 2.78 | 0.233 | — | — | 500 |
| F | 96.60 | −0.47 | 1.70 | 2.47 | 0.394 | — | — | 500 |

Comparative Examples C, D, E and F illustrate that essentially no improvement in color is obtained by simply extruding styrene acrylonitrile copolymer in the presence of water. You will note that Example C which is extruded in the presence of no water has a YI of 2.67 whereas styrene acrylonitrile copolymer extruded in the presence of .066, 0.233 and 0.394 have YIs of 2.86, 2.78 and 2.47 respectively. In other words, the color improvement is directly associated with gelation products and processes.

YI means yellowness index. L, a an b are used to determine the final YI value.

TABLE 3

| EXAMPLE | L | a | b | YI | WATER % | ACID PPM | DEPX PPH | RATE LB/HR |
|---|---|---|---|---|---|---|---|---|
| G | 91.4 | −8.35 | 21.91 | 46.69 | — | 700 | 3.0 | 500 |
| 2 | 94.70 | −6.09 | 17.21 | 25.93 | 0.24 | 693 | 3.0 | 500 |
| 3 | 95.05 | −5.79 | 16.09 | 24.14 | 0.21 | 687 | 3.0 | 500 |
| H | 92.71 | −7.00 | 23.40 | 36.03 | — | 408 | 2.0 | 340 |
| 4 | 95.08 | −4.34 | 12.34 | 18.50 | 0.54 | 408 | 2.0 | 340 |
| I | 90.08 | −8.66 | 32.87 | 52.12 | — | 591 | 3.0 | 340 |
| 5 | 93.35 | −7.72 | 22.57 | 34.52 | 0.24 | 583 | 3.0 | 340 |
| J | 88.51 | −8.14 | 36.51 | 58.91 | — | 610 | 3.0 | 340 |
| 6 | 92.70 | −7.99 | 25.14 | 38.71 | 0.24 | 610 | 3.0 | 340 |

Table 3 illustrates that admixing of a small amount of water with a gelation product during melt extrusion of the SAN Gels formed by compounding styrene acrylonitrile copolymer with an amount of diepoxide, dodecylbenzene sulfonic acid results in the formation of SAN gels which have a reduced level of yellowness index.

Example G, H, I and J are comparative examples that do not employ a water admixing step. Examples 2–6 are examples illustrating the present invention employing the admixing step. Note the improved color of examples 2 and 3 over comparative example G; the improved color of Example 4 over comparative example H; the improved color of Example 5 over comparative example I; and the improved color of Example 6 over comparative Example J.

Acid PPM means parts per million dodecylbenzenesulfonic acid based on the total parts by weight of styrene-acrylonitrile polymer.

Percents water means the percent by weight of water used in the admixing step based on the total weight of styrene-acrylonitrile polymer.

DEPX PPH means parts per hundred of DEPX based on the total parts of styrene-acrylonitrile polymer.

What is claimed is:

1. A process for making an improved color reduced gloss thermoplastic composition, said process comprising:
   (a) compounding an acrylonitrile polymer with an electrophilic reagent to form polymeric gels;
   (b) admixing an effective amount of water with said polymeric gels sufficient to reduce the yellowness index of said gels; and
   (c) blending an effective gloss reducing amount of said reduced color gels with a thermoplastic resin.

2. The process of claim 1 wherein said composition comprises from 10 to 99 weight percent of the thermoplastic resin based on the total weight of the composition.

3. The process of claim 2 wherein said thermoplastic resin is a bisphenol A polycarbonate.

4. The process of claim 1 wherein said electrophilic reagent is a diepoxide, and said compounding step is in the presence of a sulfonic acid.

5. The process of claim 4 wherein said diepoxide has the structural formula:

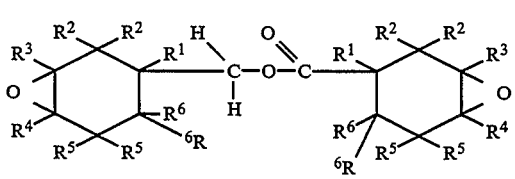

wherein each $R^1$, $R^2$, $R^3$, $R^4$, $R^5$, and $R^6$, is independently selected from the group consisting of hydrogen and alkyl radicals.

6. The process of claim 1 wherein said electrophilic reagent is a poly(epoxide) present in said compounding step in an amount of from 0.01 to 10 weight percent based on the total weight of the acrylonitrile polymer in step (a), and wherein said water in said admixing step is present in an amount of from 0.2 to 0.6 percent by weight based on the total weight of the rigid acrylonitrile polymer in step (a).

7. The process of claim 1 wherein said compounding comprises extrusion compounding.

8. The process of claim 1 wherein process consists essentially of said compounding, admixing and blending.

9. A process for making a reduced gloss thermoplastic composition, said process comprising:
   (a) compounding an acrylonitrile polymer with an electrophilic reagent to form polymeric gels;
   (b) admixing an effective amount of water with said polymeric gels sufficient to reduce the yellowness index of said gels; and
   (c) blending an effective gloss reducing amount of said gels with a polycarbonate resin, a styrene-acrylonitrile copolymer and an ABS graft polymer.

10. The process of claim 9 wherein said composition comprises from 10 to 90 weight percent of the polycarbonate resin based on the total weight of the composition.

11. The process of claim 10 wherein said polycarbonate resin is a bisphenol A polycarbonate.

12. The process of claim 11 wherein the ABS graft polymer comprises at least 50 weight percent diene rubber based on the total weight of the ABS graft polymer, said ABS graft polymer being present in the composition at a level of between 5 to 30 weight percent based on the total weight of the composition, said styrene acrylonitrile copolymer being present at a level of from 5 to 65 weight percent based, on the total weight of the composition.

13. The process of claim 9 wherein said electrophilic reagent is a diepoxide, and said compounding in the presence of an epoxide ring-opening catalyst.

14. The process of claim 13 wherein said diepoxide has the structural formula:

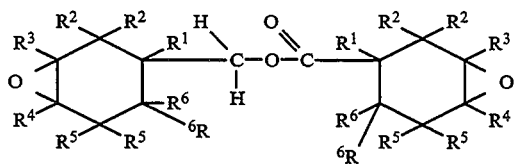

wherein each $R^1$, $R^2$, $R^3$, $R^4$, $R^5$, and $R^6$, is independently selected from the group consisting of hydrogen and alkyl radicals.

15. The process of claim 9 wherein said electrophilic reagent is a poly(epoxide) present in said compounding step in an amount of from 0.01 to 10 weight percent based on the total weight of the rigid acrylonitrile polymer in step (a).

16. The process of claim 9 wherein said process consists essentially of said compounding admixing and blending.

17. The process of claim 7 wherein said process consists essentially of said compounding and admixing.

18. The process of claim 1 wherein said electrophilic reagent consists essentially of a polyepoxide.

19. A process for making an improved color, reduced gloss thermoplastic composition, said process comprising:
   (a) compounding a rigid nitrile-containing polymer with an electrophilic reagent to form polymeric gels;
   (b) admixing an effective amount of water with said polymeric gels sufficient to reduce the yellowness index of said gels; and
   (c) blending an effective gloss reducing amount of said gels with a thermoplastic resin.

* * * * *